United States Patent [19]

Kubodera

[11] Patent Number: 4,581,646
[45] Date of Patent: Apr. 8, 1986

[54] TELEVISION RECEIVER

[75] Inventor: Tadao Kubodera, Hadano, Japan

[73] Assignee: Sony Corporation, Tokyo, Japan

[21] Appl. No.: 532,491

[22] Filed: Sep. 15, 1983

[30] Foreign Application Priority Data

Sep. 16, 1982 [JP] Japan .................................. 57-161144
Sep. 24, 1982 [JP] Japan ........................... 57-145468[U]
Oct. 7, 1982 [JP] Japan ............................ 57-152209[U]

[51] Int. Cl.⁴ ............................................ H04N 5/445
[52] U.S. Cl. ..................................... 358/181; 358/903
[58] Field of Search ...................... 358/181, 191.1, 188, 358/254, 310, 335, 903, 93

[56] References Cited

U.S. PATENT DOCUMENTS 4,139,865 2/1979 Iida et al. ............................ 358/188
4,396,941 8/1983 Nishimura ........................... 358/254

FOREIGN PATENT DOCUMENTS 52678 4/1980 Japan ................................... 358/181
1533371 11/1978 United Kingdom .
2037109 7/1980 United Kingdom .
2105539 3/1983 United Kingdom .

OTHER PUBLICATIONS

What's New in 1980, TV Receivers, by Karl Savon, Radio Electronics vol. 51, No. 3 (Mar. 1980), pp. 42-45.

*Primary Examiner*—Tommy P. Chin
*Attorney, Agent, or Firm*—Lewis H. Eslinger, Esq.; Alvin Sinderbrand, Esq.

[57] ABSTRACT

A television receiver is provided with two or more input terminals for receiving respective RF input signals from an antenna and an auxiliary device, such as a personal computer or a video game, and a terminal selector for selecting one of the input terminals. The antenna may receive a plurality of broadcast signals having different frequencies characteristic of respective channels and, for selecting either one of such broadcast signals received at a first input terminal or the auxiliary signal received at a second input terminal and which also has a characteristic frequency, the television receiver has a plurality of manually actuable channel selecting switches and a manually actuable terminal selecting switch mounted on the cabinet of the receiver, and the receiver is tuned for the signal frequency corresponding to the actuated switch. An interlock arrangement insures that only one switch at a time is actuated and enables the operator to select a channel or the auxiliary device in a single actuation. The actuation of the terminal selecting switch is readily indicated to avoid inadvertent actuation thereof. Further, the terminal selector may include a coupling member which, when the terminal selecting switch is actuated to select the second input terminal, actuates a tuning control switch for effecting tuning of the receiver to the signal applied at that selected input terminal.

8 Claims, 12 Drawing Figures

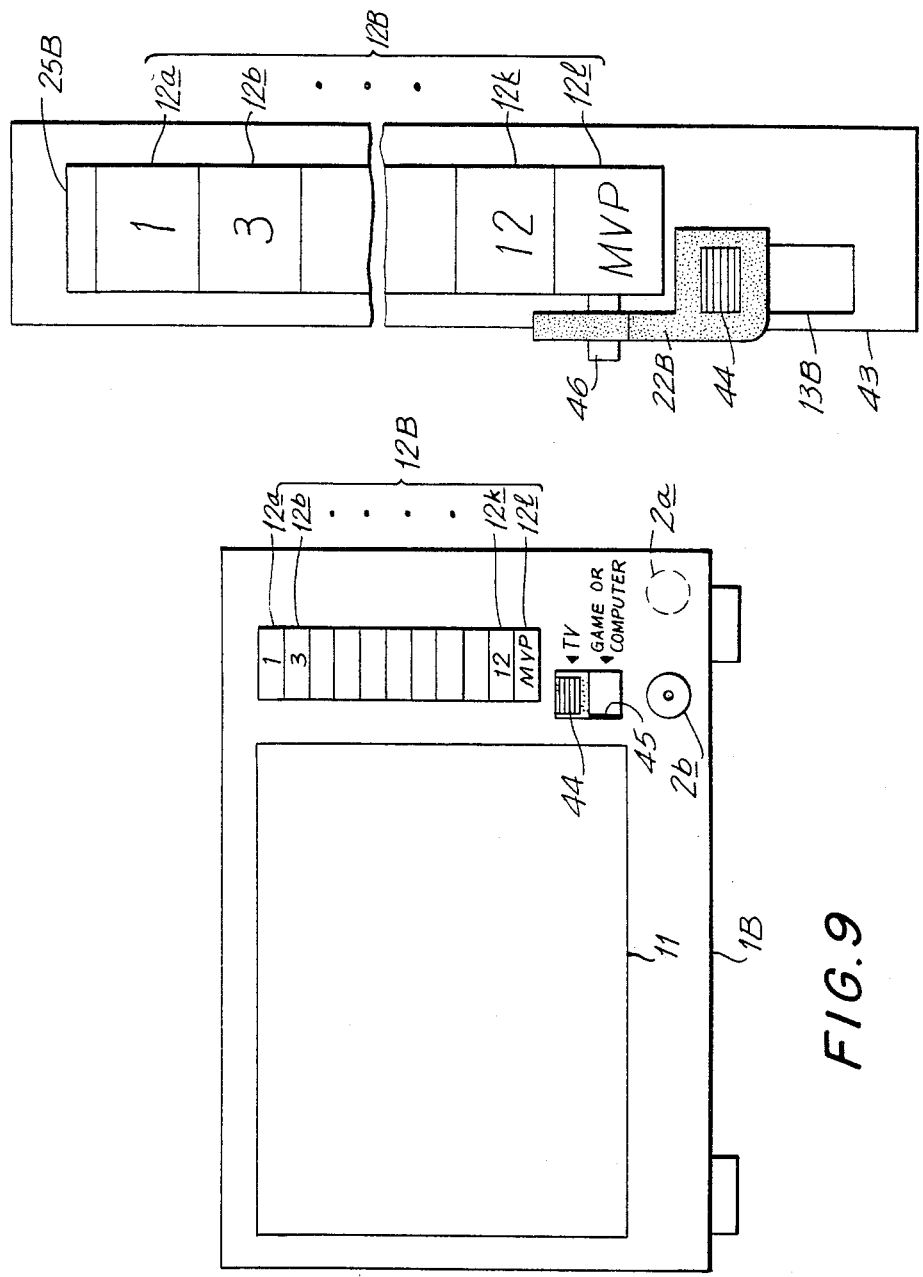

TELEVISION RECEIVER

BACKGROUND OF THE INVENTION

1. Field of the Invention

This invention relates generally to television receivers and, more particularly, is directed to a television receiver for receiving an input signal from either an antenna or an auxiliary device.

2. Description of the Prior Art

With the growing popularity of personal computers and video games, it has become desirable to connect the personal computer or video game to a conventional television receiver so that the picture tube of the receiver may serve as a display device for the video game or personal computer. In this way, the extra expense and wasted space of providing a separate picture tube or CRT for the personal computer or video game are avoided.

A conventional television receiver according to the prior art has a single input terminal for connection to an antenna. The antenna to receives a plurality of RF broadcast channel signals corresponding to different television stations, or channels, and one of the broadcast signals is selected for display on the picture tube by selective actuation of the pushbuttons or a dial mounted on the receiver for easy access. A tuning stage in the television receiver responds to actuation of a push-button, for example, in response to a characteristic tuning voltage provided by actuation of the push-button, for tuning the receiver to a particular channel.

To use the television receiver as a display device for a video game, for example, the output cable of the video game must be connected to the television receiver through the input terminal of the latter and one of the channel-selecting push-buttons must be actuated to tune the receiver for the RF frequency characteristic of the video game output. In order to avoid the necessity of physically disconnecting the antenna and attaching the output cable of the video game to the television receiver everytime it is desired to change from one to the other, an external or auxiliary switching device has been proposed as an accessory interposed between the receiver input terminal and the antenna and video game or personal computer. In one condition of the switching device, the antenna is connected to the receiver input terminal and one of the channel-selecting push-buttons on the receiver may be actuated to select the television signal being broadcast by the respective channel for display on the CRT. In another condition of the auxiliary switching device established by actuation of a condition-selecting push-button or actuating knob on the switching device, the output cable of the video game or personal computer is connected to the receiver input terminals, and another of the channel-selecting push-buttons, for example, one associated with a channel not received at the location of the television receiver, is actuated to tune the receiver for the frequency of the output of the video game or computer. However, the operation of this prior art apparatus presents distinct disadvantages. This apparatus employs switches or push-buttons on two separate objects, that is, the channel-selecting push-buttons on the television receiver and the condition-selecting push-button or knob on the switching device. Change-over from watching a particular TV station to playing a video game requires operation of the condition-selecting push-button on the terminal switching device or accessory, and also actuation of the one of the channel-selecting push-buttons corresponding to tuning for the frequency of the video game output. Similarly, change-over from playing the video game to receiving a desired station or channel on the television receiver requires first that the condition-selecting push-button of the switching device be operated to connect the antenna with the receiver input terminal and then one of the channel-selecting push-buttons must be operated to select the desired channel. Thus, two operations are necessary in changing over from one to the other of the display of the video game and the display of the desired channel.

Additionally, since the prior art apparatus requires two independent devices or housings, that is, the television receiver and the switching device or accessory, the resulting combination may be unsightly and may take up more space than a user wishes to employ for that purpose. Also, it might be necessary, in some instances, to install the switching device at a distance from the television receiver, and the resulting inconvenience to the user in walking back and forth between the two is likely to create consumer dissatisfaction.

OBJECTS AND SUMMARY OF THE INVENTION

Accordingly, it is an object of this invention to provide a television receiver that avoids the above-described difficulties encountered with the prior art.

More particularly, it is an object of this invention to provide a television receiver which may selectivley receive an input signal from either a conventional antenna or an auxiliary device, such as a video game or personal computer, without employing an external switching device or accessory.

It is a further object of this invention to provide a television receiver having a plurality of input terminals adapted for connection to an antenna and to an auxiliary devices, such as, a video game or computer and a terminal selector mounted on the cabinet of the television receiver itself for selecting one of the input terminals.

It is another object of this invention to provide a television receiver, as aforesaid, in which change-over between display of a television picture being broadcast on a selected channel and display of the output of a video game or computer can be simply effected, for example, by actuation of a single push-button or the like.

It is yet a further object of this invention to provide a unified television receiver and input terminal selector which is attractive and easily set up and operated.

It is yet another object of this invention to provide a television receiver having an input terminal selector designed to avoid inadvertent operation thereof.

In accordance with an aspect of this invention, a television receiver includes at least two input terminals for receiving respective input signals, an antenna connected to a first of these terminals for applying an antenna input signal thereto, a second of these input terminals being adapted for connection to an auxiliary input device, such as, a video game or a computer, for receiving an auxiliary input signal from the latter, input terminal selection means for selecting one of these terminals as a selected terminal, and control means cooperating with the the terminal selection means for tuning the receiver to present a display corresponding to an input signal applied to the selected terminal.

The above, and other objects, features and advantages of the invention will be apparent in the following detailed description of illustrative embodiments of the invention, which is to be read in connection with the accompanying drawings.

BRIEF DESCRIPTION OF THE DRAWINGS

FIG. 9 is a schematic front elevational view of a television receiver according to another embodiment of the present invention;

FIG. 10 is an enlarged view of a portion of FIG. 9 shown with a panel removed;

DETAILED DESCRIPTION OF PREFERRED EMBODIMENTS

Figure 1:
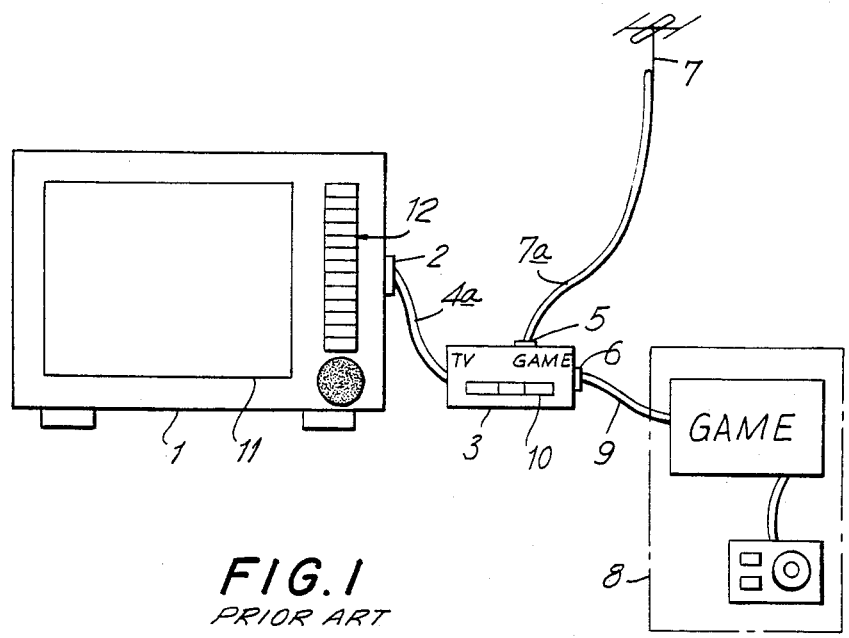
FIG. 1 is a schematic front elevational view of a television receiver and separate switching device according to the prior art.

Before proceeding with a detailed description of the invention, reference will b made to FIG. 1 as showing an arrangement according to the prior art for selectivley applying a plurality of inputs to a television receiver 1 having a single input terminal 2. In such prior art arrangement, a switching device 3 is provided apart from, or as an external accessory for television receiver 1 and has an output 3a connected to the television receiver via a cable 4 connected to input terminal 2. The antenna switching device 3 further has two input terminals 5 and 6. A conventional antenna 7 for receiving broadcast signals on different channels or stations is connected to switching device 3 through input terminal 5, while an auxiliary input device, shown as a video game 8, is connected to input terminal 6 of switching device 3 via an output cable 9. A condition selecting button 10 on switching device 3 is actuable to select either input terminal 5 or input terminal 6, that is, either an antenna input signal or game input signal, respectively, for connection through output 3a to receiver input terminal 2. The television receiver 1 also has a CRT 11 and a number of channel selecting push-buttons 12 corresponding to the various television stations or channels. It will be appreciated that the push-buttons 12 are selectively actuable to tune the receiver for the RF frequencies with which television signals are broadcast in the respective channels. Further, one of the push-buttons 12, preferably one corresponding to a channel which is not receivable at the location of the television receiver, is actuable to tune the receiver for the RF frequency of the output from the video game 8 or other auxiliary input device.

In the operation of this prior art arrangement, receiver 1 may be used as a conventional television receiver when condition-selecting push-button 10 is in the position to select input terminal 5 of switching device 3. In such case, any antenna input or broadcast signal received by antenna 7 may be displayed on CRT 11 by operation of the appropriate channel selection push-button 12 to tune the receiver accordingly, Alternatively, the condition-selecting button 10 may be moved to select input terminal 6 which receives the output signal from video game 8. In that case, the one of the channel-selecting push-buttons 12 which is operable for tuning the receiver 1 to the RF frequency of the output from video game 8 must also be actuated. Similarly, changeover from displaying the auxiliary signal from video game 8 to displaying a broadcast television signal from a selected channel or station requires first the actuation of button 10 ion switching device 3 for again applying the antenna signal to input terminal 2 and then the further actuation of one of the push-buttons 12 for selecting the desired channel. If the televisino receiver 1 and switching device 3 are remote from each other, the actuation of push-buttons on both the receiver and switching devide can prove quite inconvenient. Further, the provision of switching device 3 as an accessory or separate component external from the television receiver can result in a cluttered or unsightly appearance and in an undesirable increase in the space required therefor.

Figure 2:
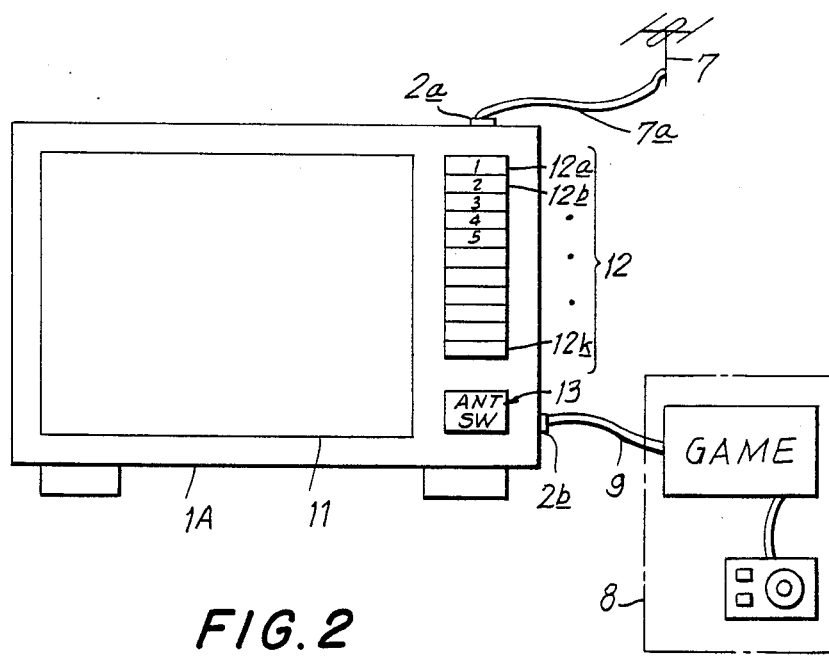
FIG. 2 is a schematic front elevational view of a television receiver according to and embodiment of the present invention.

Referring now to FIG. 2, in which elements corresponding to those described above with reference to the prior art arrangement of FIG. 1 are identified by the same reference numerals, it will be seen that a television receiver 1A according to an embodiment of this invention has a CRT 11 for displaying a selected one of input signals applied to input terminals 2a and 2b. More particularly, input terminal 2a is adapted to be connected to an antenna 7 for receiving broadcast signals therefrom, and input terminal 2b is adapted to be connected by cable 9 to video game 8 for receiving the output signal from the latter.

At the front of receiver 1A is an input terminal selector 13, which is operable to select one or the other of input terminals 2a and 2b. It will, of course, be understood that more than two input terminals could be provided on a television receiver according to the present invention, and the input terminal selector would then be adapted to select any one of these additional input terminals.

Also mounted at the front of television receiver 1A is a channel selector assembly 12 shown to include a plurality of channel selecting push-buttons 12a-12k which are selectively actuable or depressible for operating respective channel-selecting switches (not shown on FIG. 2), as hereinafter described.

The terminal selector 11 is desirable located at the front of television receiver 1A adjacent or near to channel selector assembly 12 so as to form a unified selection panel therewith. The channel selecting push-buttons 12a-12k and the terminal selector 13 control the tuning of the television receiver 1 to display either a television signal broadcast on a particular channel or the output of the video game 8. More particularly, television receiver 1A may have a conventional electronic tuner or tuning stage $1A_1$ (FIG. 3) in which, for example, a varactor, that is, an analog voltage controlled variable reactance device, such as, a variable capacitance diode, is employed as the tuning element, and the control voltae therefor is obtained by means of a potentiometer array.

Figure 3:
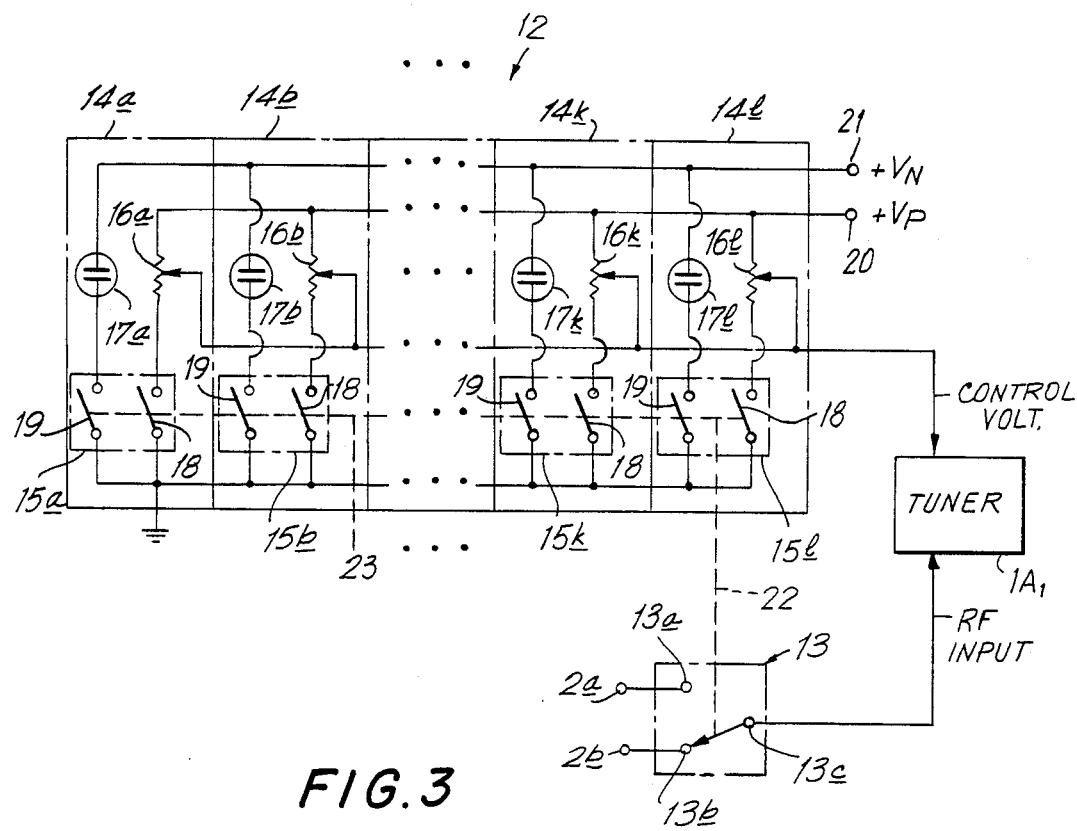
FIG. 3 is a circuit diagram showing a principle part of the television receiver of FIG. 2.

In the embodiment of this invention shown on FIG. 3, such a potentiometer array is provided in the channel selector assembly 12 comprised of tuning voltage sections 14a–14k which correspond to the channel selecting push-buttons 12a–12k, respectively, and an additional tuning voltage section 14l associated with terminal selector 13.

The tuning voltage sections 14a–14l are shown to be similar and are comprised of selecting switch assemblies 15a–15l, respectively, potentiometers 16a–16l, respectively, and visual indicators 17a–17l, respectively, for example, in the form of neon lights or LEDs.

Since the tuning voltage sections 14a–14l are similar, only the interconnections and operations of the switch assembly 15a, potentiometer 16a and visual indicator 17a in section 14a will be described in detail, and it will be understood that the interconnections and operations of the corresponding components in the other sections 14b–14l are generally the same.

In tuning voltage section 14a, switch assembly 15a is shown to include two ganged, normally open switches 18 and 19. The resistance element of potentiometer 16a is connected in series with switch 18 of switch assembly 18a between a terminal 20 connected to a source of operating voltage $+V_P$ and ground. The visual indicator 17a is similarly connected in series with switch 19 of switch assembly 15a between a terminal 21 connected to a suitable source of operating voltage $+V_N$ and ground. Thus, upon simultaneous closing of the ganged, normally open switches 18 and 19 of switch assembly 15a, a suitable predetermined tuning voltage is obtained at the movable tap of potentiometer 16a for application as a control voltage to tuner 1A$_1$, so that the latter tunes the television receiver 1A for a corresponding RF input signal. The closing of switch 19 of switch assembly 15a causes energizing of visual indicator 17a for showing the user that the television receiver is tuned for the RF input signal to which the section 14a corresponds. Of course, the potentiometers 16a–16l have their respective movable taps positioned so that different control voltages will be applied to tuner 1A$_1$ upon the selective closing of switch assemblies 15a–15l, respectively. For example, the potentiometers 16a–16k desirably have their movable taps positioned so that the control voltages applied to tuner 1A$_1$ upon the closing of switch assemblies 15a–15k will result in the tuning of receiver 1A for the RF frequencies with which television signals are broadcast in the various channels. Accordingly, the switch assemblies 15a–15k constitute channel selection switches, in that the closing of any one of the switch assemblies 15a–15k is effective to cause tuning of the receiver 1A for the respective broadcast channel. The channel selection switches 15a–15k are suitably actuable from their normally open or inoperative positions to their closed or operative positions for selecting the respective channels in response to the selective depressing or operation of push-buttons 12a–12k, respectively.

On the other hand, switch assembly 15l is suitably coupled with terminal selector 13, as indicated schematically in broken lines at 22 on FIG. 3, so that switches 18 and 19 of switch assembly 15l will be closed only when terminal selector 13 is operative to apply the output of the auxiliary device or video game 8 as the RF input to tuner 1A$_1$. More particularly, as shown on FIG. 3, terminal selector 13 may be in the form of a switch having fixed contacts 13a and 13b connected to input terminals 2a and 2b, respectively, and being alternatively engageable by a movable contact 13c which is connected to the RF input of tuner 1A$_1$. Further, the movable contact 13c is coupled, as at 22, with switches 18 and 19 of switch assembly 15l so that such switches 18 and 19 are closed, as shown on FIG. 3, when movable contact 13c of terminal selector engages fixed contact 13b. When movable contact 13c is manually changed-over to engage fixed contact 13a for applying the antenna input signals from input terminal 2a to the RF input of tuner 1A$_1$, switches 18 and 19 of switch assembly 15l are returned to their normal open or inoperative positions. It will be appreciated that the movable tap of potentiometer 16l is positioned so that, when switches 18 and 19 of switch assembly 15l are closed, the tuning or control voltage applied from potentiometer 16l to tuner 1A$_1$ will result in the tuning of receiver 1A for the RF frequency of the output from video game 8. Thus, switch assembly 15l associated with terminal selector 13 may be considered an input selection switch.

An interlock mechanism indicated schematically in broken lines at 23 on FIG. 3 is preferably provided in association with the channel selection switches 15a–15k and the input selection switch 15l and is generally operative, as hereinafter described in detail, for retaining any one of the selection switches 15a–15l in its closed or operative position upon the actuation thereof to such operative position, and for releasing the previously retained selection switch for return to its normal opened or inoperative position in response to the actuation of any other one of the selection switches 15a–15l to its closed or operative position. Thus, the interlock mechanism 23 is effective to provide for the closing of only one of the selection switches 15a–15l at any one time while the other selection switches remain open. In this connection, it is to be noted that, by reason of the coupling indicated at 22 between selection switch 15l and terminal selector 13, the opening of selection switch 15l, for example, in response to the closing of any one of the channel selection switches 15a–15k, is accompanied by the change-over of movable contact 13c to engage the fixed contact 13a in terminal selector 13.

The operations of the television receiver 1A according to the embodiment of this invention described above with reference to FIGS. 2 and 3 will be summarised as follows:

With terminal selector 13 initially positioned to engage its movable contact 13c with fixed contact 13a, RF signals received by antenna 7 and applied to input terminal 2a are supplied through terminal selector 13 to the RF input of tuner 1A$_1$. Upon the manual actuation or depression of any one of the channel selecting push-buttons 12a–12k, the corresponding channel selection switch 15a–15k is actuated to its closed or operative position for causing a corresponding tuning voltage to be applied from the respective potentiometer 16a–16k to tuner 1A$_1$ so that the CRT 11 of receiver 1A will display the video portion of the television signal being broadcast on the respective channel. Simultaneously, the corresponding one of the visual indicators 17a–17k will be energized for indicating the channel to which the television receiver is tuned. The one of the channel selection switches 15a–15k moved to its operative or closed position will be retained thereat by interlocking mechanism 23 until such time as another of the channel selecting push-buttons 12a–12k is depressed or actuated, whereupon the channel selection switch corresponding to the newly actuated push-button will be closed, and the previously closed channel selection switch is released by mechanism 23 for return to its normal open or inoperative position. Similarly, upon the manual actuation of terminal selector 13 to the position shown on FIG. 3 and the resulting movement of input selection switch 15*l* to its closed position, any one of the channel selection switches 15*a*–15*k* previously held in its closed or operative positioned is released for return to its inoperative or opened position shown on FIG. 3. With input selection switch 15*l* in its closed or operative position, the resulting tuning or control voltage applied from potentiometer 16*l* to tuner 1A$_1$ is effective to cause tuning of receiver 1A for the frequency of the RF output from the auxiliary device or video game 8 then being applied through terminal 26*a* and terminal selector 13 to the RF input of tuner 1A$_1$. Thus, the output of video game 8 can then be displayed on CRT 11.

It will be appreciated that the change-over of receiver 1A according to this invention from the display of a television signal being broadcast on a selected channel to the display of the output of video game 8 conveniently requires only the actuation of a single control member, that is, the actuation of terminal selector 13 by the operator of the television receiver. Thereafter, when it is desired to return the television receiver 1A to the displaying of the television signal being broadcast on a selected channel, it is again only necessary to actuate a single control member. More specifically, the depressing or actuation of any one of the channel selecting push-buttons 12*a*–12*k* for closing the respective one of the channel selection switches 15*a*–15*k* will cause interlock mechanism 23 to release input selection switch 15*l* for return from its operative or closed position to its normal open position during which coupling 22 is effective to return terminal selector 13 to the position in which movable contact 13*c* is again operative to connect input terminal 2*a* to the RF input of tuner 1A$_1$.

In the embodiment of the invention described above with reference to FIGS. 2 and 3, the knob or other portion of terminal selector 13 which is manually operable by the user of television receiver 1A for selecting the display of the output of the video game or other auxiliary device 8 is shown to be distinguished, both in its mode of operation and form, from the push-buttons 12*a*–12*k* which are selectively actuable for selecting, for display by receiver 1A, television signals broadcast on respective channels. However, as shown on FIG. 4, in a television receiver according to this invention, a switch assembly indicated schematically at 24 may be provided to perform the functions of terminal selector 13 and input selection switch 15*l* on FIG. 3, and such switch assembly 24 may be mounted in a frame or chassis 25 in which the channel selection switches 15*a*–15*k* are similarly mounted. In this case, switch assembly 24 is operable by a respective push-button 26 which is manually actuable similarly to the push-buttons 12*a*–12*k* associated with channel selection switches 15*a*–15*k*. In order to permit channel selection switches 15*a*–15*k* and switch assembly 24 to be operated from outside the chassis 25, actuators 27*a*–27*k* extend between push-buttons 12*a*–12*k* and the respective switches 15*a*–15*k*, and an actuator 28 similarly extends between push-button 26 and switch assembly 24. Pins or terminals 29*a*–29*k* extend from channel selection switches 15*a*–15*k*, and pins or terminals 30 similarly extend from switch assembly 24 to provide means by which the respective switches or switch assemblies can be connected in a circuit similar to that of FIG. 3.

Figure 4:
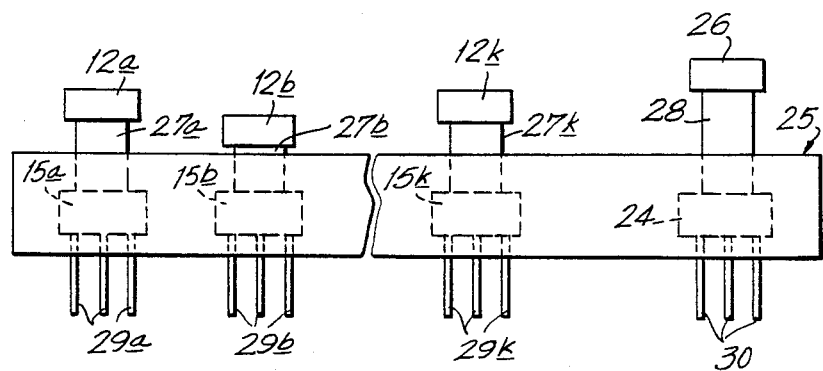
FIG. 4 is a schematic view showing an assembly of push-button operated switches desirably employed in another embodiment of the present invention.

In the embodiment of the invention shown on FIG. 4, each of the channel selection switches 15*a*–15*k* is in its open or inoperative position when the respective push-button 12*a*–12*k* is in an extended position, and each of the channel selection switches is selectively changed-over to its closed or operative position when its respective push-button 12*a*–12*k* is manually depressed, for example, to the position indicated for the push-button 12*b* on FIG. 4. Similarly, switch assembly 24 achieves the functional equivalent of input selection switch 15*l* being in its open or inoperative position and of selector 13 having its movable contact 13*c* engaged with the fixed contact 13*a* on FIG. 3 when push-button 26 is in its extended position shown on FIG. 4. The extended or rest position of push-button 26 is shown to be displaced forwardly or projected beyond the extended or rest positions of push-buttons 12*a*–12*k*, and push-button 26 is provided with a relatively long operating stroke from its extended or rest position to its depressed or operative position. Thus, the user of the television receiver can readily distinguish between push-buttons 12*a*–12*k* and push-button 26. Upon actuation or depressing of push-button 26 to its operative position, switch assembly 24 is changed-over for establishing the equivalent of the condition of terminal selector 13 and switch 15*l* in the positions shown on FIG. 3.

Referring now to FIGS. 5–8, it will be seen that, in a structural arrangement corresponding to the embodiment shown schematically on FIG. 4, the actuators 27*a*–27*k* and 28 are in the form of rods extending between the respective push-buttons and switch assemblies and being longitudinally slidable in parallel with each other in aligned sets of guide holes 31 and 32 formed in parallel, spaced apart plates 33 and 34, respectively, of the frame or chassis 25. Each of the rods 27*a*–27*k* and 28 is shown to have a flange 35 thereon between plates 33 and 34, and a helical compression spring 36 is provided on each of the rods 27*a*–27*k* and 28 between the respective flange 35 and plate 34 for urging the respective actuator or rod upwardly, as viewed on FIGS. 5–8, that is, in the direction toward the normal or rest position of the respective push-button 12*a*–128*k* or 26.

Figure 5:
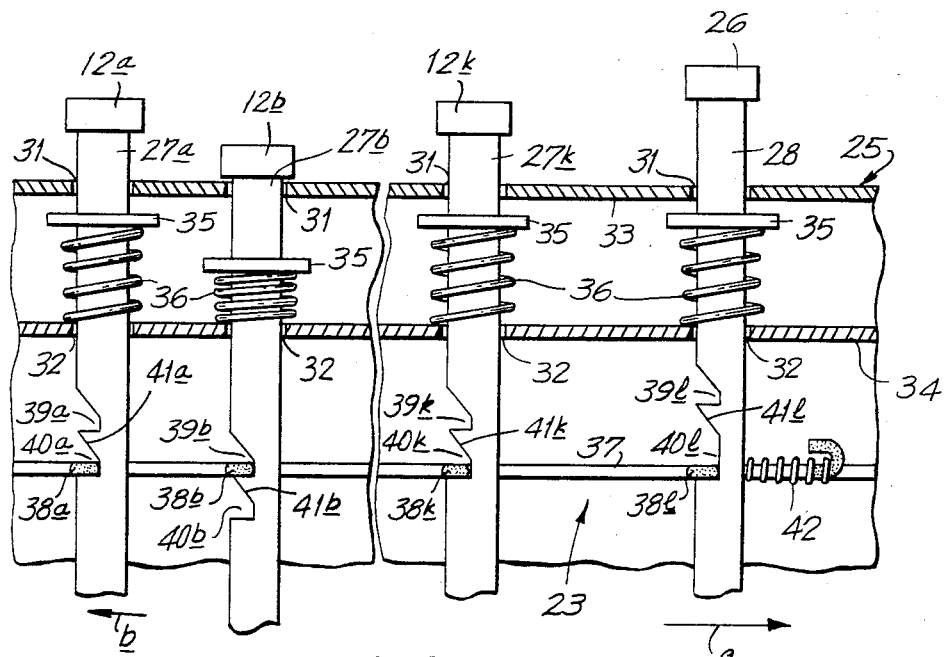
FIGS. 5-8 are schematic side elevational views, partly in section, and illustrating details of push-button mechanisms in the assembly of FIG. 4 in various different operating conditions thereof.

In the structural arrangement shown on FIGS. 5–8, the interlock mechanism 23 represented only schematically on FIG. 3 is shown to include an elongated locking member 37 extending in chassis or frame 25 generally parallel to plates 33 and 34, that is, at right angles to the longitudinal axes of rods 27*a*–27*k* and 28, and being mounted for longitudinal sliding movement in the directions of the opposed arrows a and b on FIG. 5. The elongated slidable locking member 37 has a plurality of laterally directed locking arms 38*a*–38*l* extending therefrom for cooperation with actuators 27*a*–27*k* and 28, as hereinafter described. More particularly, each of actuators or rods 27*a* or 27*k* has laterally opening, spaced apart recesses 39*a*, 40*a*–39*k*, 40*k* formed therein to define coupling means in association with the lateral arms 38*a*–38*k* by which the operative and inoperative positions, respectively, of push-buttons 12*a*–12*k* and of the respective channel selection switches 15*a*–15*l* are established. Further, each of the rods or actuators 27*a*–27*k* has a transition portion 41*a*–41*k* which is inclined relative to the longitudinal axis of the actuator and extends from the recess 40*a*–40*k* to the recess 39*a*–39*k*. Similarly, actuator 28 has recesses 39*l* and 40*l* opening laterally with an inclined transition portion 41*l* therebetween for cooperation with arm 38*l* of locking member 37. However, the recess 40*l* in actuator 28 has a dimension along the latter that is substantially larger than the corresponding dimensions of the recesses 40a-40k in actuators 27a-27k. A spring 42 acts on locking member 37 for urging the latter in the direction of the arrow a on FIG. 5, that is, in the direction for moving arms 38a-38l against actuators 27a-27k and 28 at the sides of the latter having the recesses therein. The described recesses in actuators 27a-27k and 28 are located along the latter so that, when any one of the push-buttons 12a-12k and 26 is in its inoperative or rest position, the respective arm 38a-38l of locking member 37 is engageable in the recess 40a-40l, and particularly against the surface thereof extending at right angles to the longitudinal axis of the actuator for establishing such inoperative or rest position against the force of the respective spring 36. However, when one of the push-buttons, for example, the push-button 12b on FIG. 5, is depressed to its operative position, the resulting longitudinal movement of the respective actuator 27b against the force of the respective spring 36 disposes the respective recess 39b to receive the respective arm 38b of locking member 37. The resulting engagement of arm 38b against the surface of recess 39b which extends at right angles to the longitudinal axis of actuator 27b provides a coupling between actuator 27b and locking member 37 by which the operative or depressed position of push-button 12b is maintained even after the user withdraws the depressing force from push-button 12b. Therefore, after push-button 12b is manually depressed to its operative position for establishing the operative or closed position of the respective channel selection switch 15b, locking member 37 of interlock mechanism 23 is coupled with actuator 27b for maintaining the closed or operative position of switch 15b and thereby causing display by the television receiver of the television signal being broadcast on the channel corresponding to push-button 12b.

Figure 6:
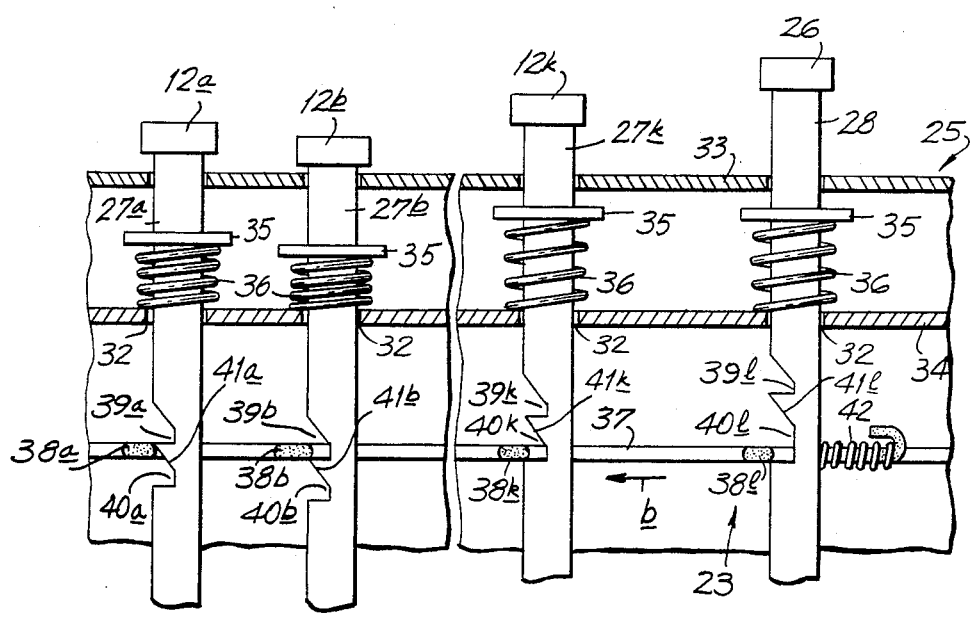
Figure 7:
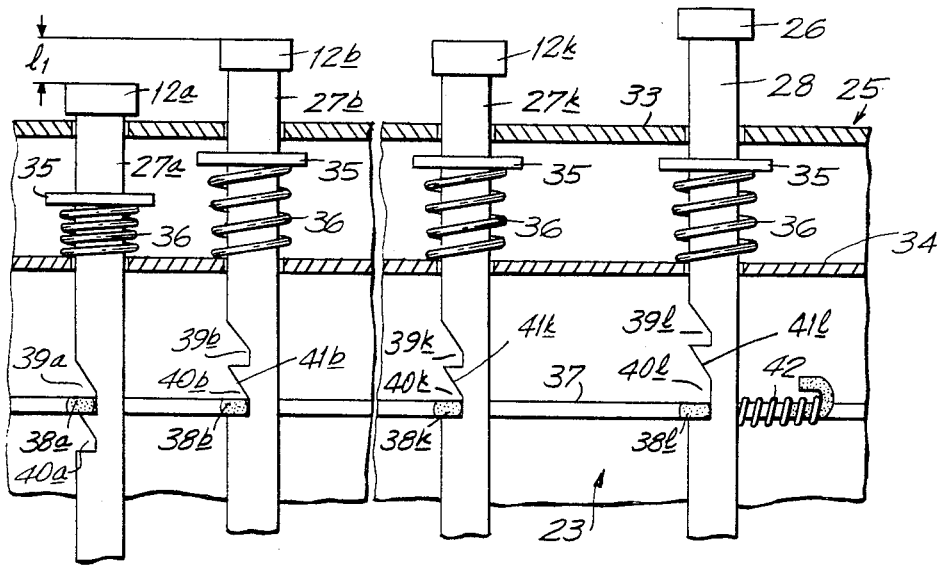

When it is desired to change the channel being received and displayed by the television receiver, for example, when it is desired to cause the television receiver to display the television signal being broadcast by the channel associated with push-button 12a, such push-button 12a is depressed toward its operative position, as shown on FIG. 6. In the course of the depressing of push-button 12a toward its operative position, the corresponding longitudinal movement of actuator 27a causes the inclined transition portion 41a thereof to ride against arm 38a of locking member 37 for displacing the latter in the direction of the arrow b to a disengaged position in which arm 38b is withdrawn from the recess 39b of actuator 27b associated with the previously operatively disposed push-button 12b. Thus, in the course of the movement of push-button 12a to its operative position, the previously operatively disposed push-button 12b and its actuator 27b are released from locking member 37 so that spring 36 associated with actuator 27b can return push-button 12b to its rest or inoperative position and thereby establish the open or inoperative position of the respective channel selection switch 15b. Of course, when push-button 12a has attained its operative position, as shown on FIG. 7, arm 38a registers with recess 39a and is moved into the latter by the action of spring 42 on locking member 37 so that push-button 12a and its actuator 27a are thereafter held in the operative position for establishing the closed or operative position of channel selection switch 15a and thereby causing the television receiver to display the television signal being broadcast on the channel to which push-button 12a corresponds.

Of course, so long as any one of push-buttons 12a-12k is in its operative position for selecting the television signal broadcast on a respective channel to be displayed by the television receiver, push-button 26 remains in its inoperative or rest position established by the engagement of arm 38l of locking member 37 in recess 40l of actuator 28 with the result that the corresponding switch assembly 24 causes the signals received by antenna 7 to be applied to the RF input of the tuner.

Figure 8:
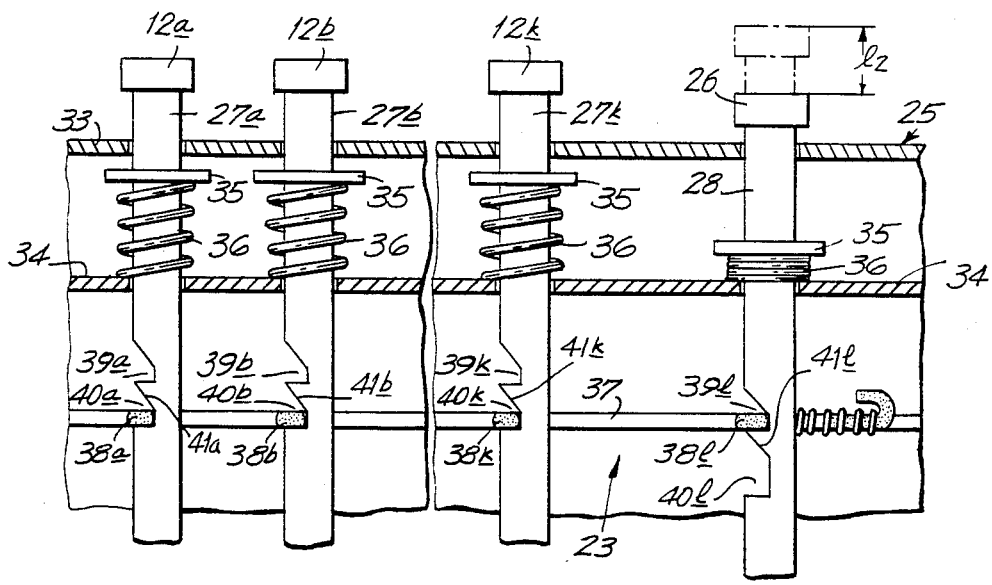

However, if, at any time, push-button 26 is depressed to its operative position, as shown on FIG. 8, in the course of the resulting movement of the corresponding actuator 28, locking member 37 is displaced in the direction of the arrow b to its disengaged position by the action of the inclined transition portion 41l against arm 38l. Therefore, as push-button 26 is moved to its operative position for establishing the condition of switch assembly 24 equivalent to the combined action of terminal selector 13 and switch assembly 15l in the positions shown on FIG. 3, any of the channel selecting push-buttons 12a-12k previously locked in its operative position for causing tuning of the television receiver to the corresponding channel is released by interlock mechanism 23 for return by the respective spring 36 to its inoperative or rest position, as shown on FIG. 8. When push-button 26 attains its fully depressed or operative position, as on FIG. 8, arm 38l of locking member 37 registers with recess 39l and is moved into the latter by the action of spring 42 on locking member 37 so that the engagement of arm 38l against the surface of recess 39l extending at right angles to the longitudinal axis of actuator 28 is thereafter effective to lock push-button 26 in its depressed or operative position. So long as push-button 26 remains in its depressed or operative position, the respective switch assembly 24 causes the output of the video game or other auxiliary device 8 to be applied to the RF input of the tuner while the television receiver is tuned for the frequency of such input so as to display the video game output on its CRT.

Of course, at any time while push-button 26 is in its depressed or operative position, the movement of any one of the channel-selecting push-buttons, for example, the push-button 12a, toward its depressed or operative position, as on FIG. 6, would again be accompanied by the displacement of locking member 37 to its disengaged position for withdrawing arm 38l from recess 39l and thereby permitting spring 36 associated with actuator 28 to restore push-button 26 to its rest or inoperative position.

It will be appreciated from the foregoing that actuation of only the single push-button 26 to its operative position is required for applying the output of the video game or other auxiliary device 8 to the RF input of the television receiver tuner and further for tuning the receiver to the frequency of such RF input. Similarly, only the actuation of one of the push-buttons 12a-12k is required for applying the antenna output as the RF input to the tuner and for tuning the television receiver for the channel to which the depressed or actuated push-button 12a-12k corresponds. It is further to be appreciated, by reason of the previously described relative large dimension of the recess 40l in the direction along actuator 28, that push-button 26 projects forwardly beyond the other push-buttons 12a-12k in the rest or inoperative positions thereof and, further, that the stroke $l_2$ of push-button 26 from its rest or inoperative position to its depressed or operation position (FIG. 8) is substantially larger than the stroke $l_1$ (FIG. 7) of any of the other push-buttons 12a–12k between their operative and inoperative positions. By reason of such difference between the strokes 1₁ and 1₂, the user of the television receiver can readily distinguish between operation of push-button 26 for causing the television receiver to display the output of the video game 8 or the operation of one of the push-buttons 12a–12k for causing the television receiver to display the television signal being broadcast on the respective channel. Accordingly, if push-button 26 is inadvertently depressed, such error can be easily recognized or perceived from the relatively large operating stroke of the push-button.

Referring now to FIG. 9, it will be seen that, in a television receiver 1B according to another embodiment of this invention, two input signal terminals 2a and 2b are again provided, for example, at the back and front of the cabinet of receiver 1B. In this case, the input terminal 2a may be connected with an antenna or with the output of a video tape recorder, while the other input terminal 2b is conveniently located for connection to the output of a video game or personal computer which may be frequently connected to, or disconnected from the television receiver. The television receiver 1B has a channel selector assembly 12B comprised of a plurality of push-buttons 12a–12l associated with normally open switch assemblies 15a–15l, respectively, which generally correspond to the similarly numbered switch assemblies in the tuning control circuit of FIG. 3. Thus, switch assemblies 15a–15l of selector assembly 12B are adapted to be selectively closed for causing tuning of television receiver 1B for a respective RF input frequency in response to actuation or depressing of the respective push-buttons 12a–12l. The push-buttons 12a–12l and switch assemblies 15a–15l are shown to be mounted in a suitable array on a frame 25B, and the selector assembly 12B further preferably includes an interlock mechanism (not shown) which may be similar to the interlock mechanism 23 described above with reference to FIGS. 5–8, and which functions similarly to hold a selected one of switch assemblies 15a–15l in its closed position after actuation or depressing of the respective push-button 12a–12l and until another of the push-buttons is actuated for closing the respective other one of switch assemblies 15a–15l.

In the case of the television receiver 1B, the potentiometers associated with switch assemblies 15a–15l, for example, at 16a–16l, respectively, in the tuning control circuit of FIG. 3, are adjusted so that selective actuation or depressing of push-buttons 12a–12k of selector assembly 12B will be effective to tune receiver 1B for displaying television signals broadcast on respective locally received channels, while actuation of push-button 12l will cause tuning of the television receiver for the RF output of a video tape recorder connected to input terminal 2l or of a video game or other auxiliary device connected to input terminal 2b.

Selector assembly 12B is further shown to include a slide switch 13B corresponding to the terminal selector 13 on FIG. 3, and being mounted immediately below switch assembly 15l on a circuit board 43 which is also connected with switch assemblies 15a–15l. Slide switch 13B has an actuating knob or button 44 projecting forwardly therefrom through a vertically elongated slot 45 in a cover plate or panel 33B, and being movable manually between a raised position (FIG. 11) in which slide switch 13B connects terminal 2a to the RF input of the tuner, and a lowered position (FIG. 12) in which slide switch 13B connects input terminal 2b to the RF input of the tuner.

In order to ensure that switch assembly 15l will be closed to effect tuning of receiver 1B for the RF output of a video game or other auxiliary device connected to input terminal 2b when slide switch 13B is effective to connect such input terminal 2b with the RF input of the tuner or tuning stage of receiver 1B, a projection 46 extends laterally from one side of push-button 12l and is slidably engageable by an arm 22B which is fixed relative to actuating button 44, for example, by being formed integrally therewith, and which forms a coupling between terminal selecting slide switch 13B and switch assembly 15l. More particularly, coupling arm 22B is shown on FIGS. 11 and 12 to include an inverted, hook-shaped upper part 47 which extends over projection 46. Such hook-shaped part 47 has a downwardly directed free-end portion 48 which, at its back surface, has offset upper and lower plane surface portions 48a and 48b, respectively, and an inclined intermediate surface portion 48c extending therebetween. Further, hook-shaped upper part 47 of coupling arm 22B defines a relatively wide gap between plane surface portion 48b and the adjacent back portion 49 to permit movement of push-button 12l between its operative and inoperative positions while projection 46 is disposed in such relatively wide gap.

Figure 11:
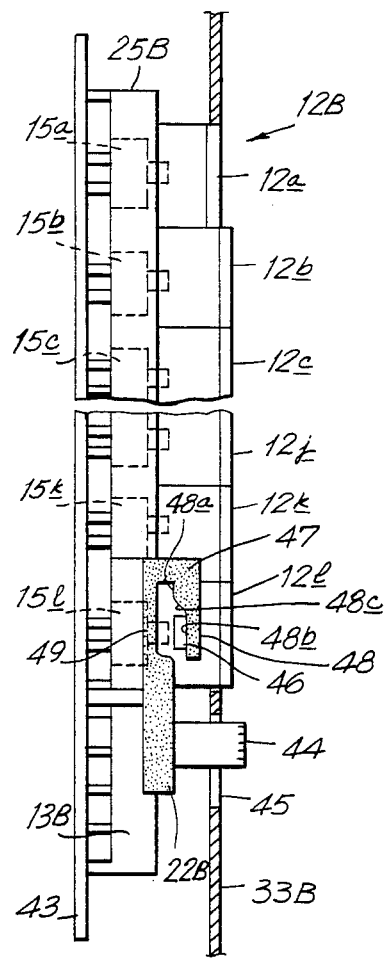
FIG. 11 is a side elevational view of FIG. 10, showing a terminal selector in a first position thereof.

When button 44 is in its raised position (FIG. 11) for disposing slide switch 13B in the condition for connecting input terminal 2a to the RF input of the tuner, plane surface portion 48b of arm 22B confronts projection 46 so that push-button 12l can assume its rest or inoperative position as shown on FIG. 11, or can be manually depressed to its operative position for closing switch assembly 15l and thereby tuning the receiver for the frequency of an RF output from a video tape recorder which may then be connected to terminal 2a. Alternatively, with button 44 in the position shown on FIG. 11, any of the other push-buttons 12a–12k can be manually depressed for tuning receiver 1B for displaying a television signal broadcast on a respective channel and being received by the antenna then connected to input terminal 2a.

By reason of the previously mentioned interlock mechanism (not shown on FIGS. 11 and 12), any one of push-buttons 12a–12l, after being depressed to its operative position with button or knob 44 in its raised position (FIG. 11) will be thereafter retained in its depressed or operative position by the action of the interlock mechanism until the latter is released in response to the depressing of another one of push-buttons 12a–12l, as previously described with reference to interlock mechanism 23 of FIGS. 5–8.

Figure 12:
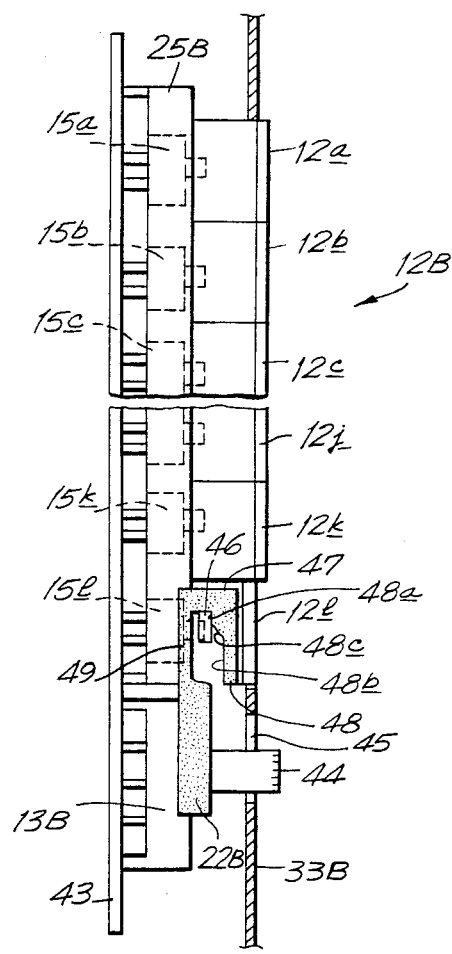
FIG. 12 is a view similar to that of FIG. 12, but showing the terminal selector in a second position thereof.

When button or knob 44 is manually moved to its lowered position (FIG. 12) and thereby causes slide switch 13B to connect input terminal 2b to the RF input of the tuner in receiver 1B, inclined surface portion 48c of coupling arm 22B rides against projection 46 which is ultimately engaged by the rearwardly offset upper surface portion 48a with the result that projection 46, and hence push-button 12l, are moved rearwardly or depressed for disposing and holding push-button 12l in its operative position. Thus, in response to movement of button 44 to its lowered position, push-button 12l is depressed for closing switch assembly 15l and thereby causing receiver 1B to be tuned for the RF output of the video game or other auxiliary device connected to input terminal 2b and applied through slide switch 13B to the RF input of the tuner. In the course of such movement of push-button 12*l* to its depressed or operative position in response to displacement of button or knob 44 to its lowered position, the previously mentioned interlock mechanism (not shown) is released with the result that any of the push-buttons 12*a*-12*k* previously held in its depressed or operative position, for example, push-button 12*a* on FIG. 11, is released for return to its rest or inoperative position, as shown on FIG. 12. Thus, when it is desired to change-over television receiver 1B from displaying a television signal which is being broadcast on a selected channel or which is being reproduced by a video tape recorder and applied to input terminal 2*a*, to the displaying of the output of a video game or other auxiliary device connected to input terminal 2*b*, the user need only actuate a single member, that is, the user need only move button or knob 44 from its raised position to its lowered position (FIG. 12). Conversely, when only the single button or knob 44 is returned to its raised position, slide switch 13B is restored to the condition in which input terminal 2*a* is again connected to the RF input of the television receiver tuner and, by reason of the previously mentioned interlock mechanism (not shown), switch assembly 15*l* remains in its closed position so that the receiver is tuned for the frequency of the RF output that may then be applied from a video tape recorder to input terminal 2*a*.

It will be appreciated from the foregoing that, in the various described embodiments of this invention, change-over of the television receiver, between the condition for displaying a broadcast television signal or other input applied to terminal 2*a* and the condition for displaying the output of a video game or other auxiliary device applied to input terminal 2*b*, can be conveniently and simply effected at the television receiver itself. Further, since switching accessories independent of the television receiver are not employed for effecting the foregoing change-over, a desirably uncluttered appearance of the receiver is achieved.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A television receiver comprising:

at least a first input terminal for receiving a plurality of antenna input signals corresponding to a plurality of channels, and a second input terminal adapted for connection to an auxiliary input device for receiving an auxiliary input signal from the latter;

tuning means for tuning said receiver to a selected one of said antenna input signals and said auxiliary input signal;

channel selection means including a plurality of manually actuable channel selection switches respectively corresponding to said channels and each having operative and inoperative positions, each of said channel selection switches causing said tuning means to tune the receiver to the antenna input signal of the corresponding one of said channels when in said operative position of the respective channel selection switch;

input terminal selection means including a manually actuable input selection switch also having operative and inoperative positions corresponding to said second and first input terminals, respectively, said input selection switch causing said tuning means to tune the receiver to said auxiliary input signal in said operative position of said input selection switch; and interlock means responsive to the actuation of any one of said channel and input selection switches to its operative position for returning the remainder of said channel and input selection switches to their respective inoperative positions;

said channel and input selection switches having respective actuators each with first and second coupling means corresponding respectively to said operative and inoperative positions of the respective selection switch, and spring means urging each of said actuators to said inoperative position of the respective selection switch;

said interlock means including a locking member having a plurality of third coupling means corresponding respectively to said actuators for the selection switches, and means mounting said locking member for movement between an engaging position in which each of said third coupling means is selectively engageable with said first and second coupling means of the corresponding one of said actuators for establishing said operative or inoperative position, respectively, of the respective selection switch and a disengaging position in which all of said third coupling means are disengaged from said coupling means of the corresponding actuators; and each of said actuators having a transition portion engageable with said locking member during displacement of the respective selection switch from its inoperative position toward its operative position for moving said locking member to said disengaging position, whereby, in the course of the displacement of any one of said selection switches to said operative position thereof, any other one of said selection switches previously held in its operative position by the engagement of the respective first coupling means by said corresponding third coupling means is released for return to said inoperative position of the respective selection switch by said spring means in response to movement of said locking member to said disengaging position.

2. A television receiver according to claim 1; wherein said terminal selection means further includes coupling means movable between a first position released from said input selection switch and a second position for urging and holding said input selection switch in said operative position independently of said interlock means.

3. A television receiver according to claim 2; wherein said terminal selection means further includes a terminal selecting switch coupled with said coupling means to select said second input terminal when said coupling means is moved to said second position from said first position.

4. A television receiver according to claim 1; wherein said manually actuable selection switches are mounted on a front wall of said television receiver.

5. A television receiver according to claim 1; wherein said selection switches have respective push buttons for actuating the same.

6. A television receiver according to claim 5; wherein one of said push buttons corresponding to said input selection switch has a long operating stroke for change-over of said input selection switch from said inoperative position to said operative position thereof; and said push buttons corresponding to said channel selection switches have short operating strokes for change-over of said channel selection switches between said inoperative and operative positions of said channel selection switches.

7. A television receiver according to claim 1; wherein said auxiliary device is a computer.

8. A television receiver according to claim 1; wherein said auxiliary device is a video game.

* * * * *